(12) United States Patent
Bishop

(10) Patent No.: US 10,097,805 B2
(45) Date of Patent: Oct. 9, 2018

(54) MULTI-IMAGE COLOR REFINEMENT WITH APPLICATION TO DISPARITY ESTIMATION

(71) Applicant: Apple Inc., Cupertino, CA (US)

(72) Inventor: Thomas E. Bishop, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 14/882,106

(22) Filed: Oct. 13, 2015

(65) Prior Publication Data

US 2017/0104976 A1 Apr. 13, 2017

(51) Int. Cl.
*H04N 13/02* (2006.01)
*H04N 13/00* (2018.01)

(52) U.S. Cl.
CPC ..... *H04N 13/0203* (2013.01); *H04N 13/0048* (2013.01); *H04N 13/0257* (2013.01); *H04N 13/0271* (2013.01)

(58) Field of Classification Search
CPC ........... H04N 13/0271; H04N 13/0257; H04N 13/0048; H04N 13/0203
See application file for complete search history.

(56) References Cited

U.S. PATENT DOCUMENTS

| 7,317,830 | B1* | 1/2008 | Gordon | G06K 9/38 382/173 |
| 8,811,811 | B1 | 8/2014 | Wetzel | |
| 2006/0045329 | A1 | 3/2006 | Jones | |
| 2008/0152192 | A1* | 6/2008 | Zhu | G06K 9/00771 382/103 |
| 2012/0195493 | A1 | 8/2012 | Lin | |
| 2014/0063188 | A1 | 3/2014 | Smirnov | |
| 2014/0198977 | A1* | 7/2014 | Narasimha | G06T 5/007 382/154 |

(Continued)

OTHER PUBLICATIONS

Chakrabarti, et al., "An Empirical Camera Model for Internet Color Vision," Proc. British Machine Vision Conference (BMVC), 2009.

(Continued)

*Primary Examiner* — Sathyanaraya V Perungavoor
*Assistant Examiner* — Peet Dhillon
(74) *Attorney, Agent, or Firm* — Blank Rome LLP

(57) ABSTRACT

Systems, methods, and computer-readable media to improve multi-image color-refinement operations are disclosed for refining color differences between images in a multi-image camera system with application to disparity estimation. Recognizing that corresponding pixels between two (or more) images of a scene should have not only the same spatial location, but the same color, can be used to improve the spatial alignment of two (or more) such images and the generation of improved disparity maps. After making an initial disparity estimation and using it to align the images, colors in one image may be refined toward that of another image. (The image being color corrected may be either the reference image or the image(s) being registered with the reference image.) Repeating this process in an iterative manner allows improved spatial alignment between the images and the generation of superior disparity maps between the two (or more) images.

19 Claims, 13 Drawing Sheets

(56) References Cited

U.S. PATENT DOCUMENTS

2015/0199566 A1* 7/2015 Moore ............... G06K 9/00442
348/47

OTHER PUBLICATIONS

Hirschmuller, et al., "Evaluation of Stereo Matching Costs on Images with Radiometric Differences," IEEE Transactions on Pattern Analysis and Machine Intelligence, Aug. 11, 2008.

Jiao, et al., "Local Stereo Matching with Improved Matching Cost and Disparity Refinement," IEEE Multimedia, vol. 21, Issue 4, Sep. 9, 2014.

Otto, et al., "A 'Region-Growing' Algorithm for Matching of Terrain Images," Journal of Image and Vision Computing, vol. 7, Issue 2, May 1989.

Spangenberg, et al., "Weighted Semi-Global Matching and Center-Symmetric Census Transform for Robust Driver Assistance," In Wilson, R., Hancock, E., Bors, A., Smith, W., eds.: Computer Analysis of Images and Patterns, vol. 8048 of Lecture Notes in Computer Science. Springer Berlin Heidelberg (2013) 34-41. http://link.springer.com/content/pdf/10.1007%2F978-3-642-40246-3_5.pdf.

* cited by examiner

ITERATION 1

INPUT: RGB IMAGE A (REFERENCE), RGB IMAGE B

ITERATION 2
INPUT: RGB IMAGE A (REFERENCE), RGB IMAGE B

ITERATION 5
INPUT: RGB IMAGE A (REFERENCE), RGB IMAGE B

MULTI-IMAGE COLOR REFINEMENT WITH APPLICATION TO DISPARITY ESTIMATION

BACKGROUND

This disclosure relates generally to the field of image processing. More particularly, but not by way of limitation, it relates to a technique for improving disparity estimation operations by incorporating color-refinement estimation therein.

The process of estimating the depth of a scene from two cameras is commonly referred to as stereoscopic vision and, when using multiple cameras, multi-view stereo. In practice, many multi-camera systems use disparity as a proxy for depth. (As used herein, disparity is taken to mean the difference in the projected location of a scene point in one image compared to that same point in another image captured by a different camera.) With a geometrically calibrated camera system, disparity can be mapped onto scene depth. The fundamental task for such multi-camera vision-based depth estimation systems then is to find matches, or correspondences, of points between images from two or more cameras. Using geometric calibration, the correspondences of a point in a reference image (A) can be shown to lie along a certain line, curve or path in another image (B).

Typically image noise, differences in precise color calibration of each camera, and other factors can lead to multiple possible matches and incorrect matches when considering only single points (i.e., pixels). For this reason, many known matching techniques use image patches or neighborhoods to compare the region around a point in image A with the region around a candidate point in image B. Simply comparing a whole patch rather than a sampled pixel value can mitigate noise, but not color biases from one image to another such as are present between almost any two different sensors.

Methods such as Normalized Cross-Correlation (NCC) or Census transform can obtain better matches of image features when there are color or lighting changes between the images. While these approaches provide improved matching, they do so at the cost of filtering and discarding some of the original images' intrinsic information: namely areas of limited texture where there is still a slow gradient (e.g., a slow change in color or intensity). For example, a transition from light to dark across a large flat wall in a scene will be transformed by these methods so as to contain little matching information except at the area's edges. With either pixel-wise or patch-based matching, gradually changing image areas also cannot normally be matched.

SUMMARY

In one embodiment the disclosed concepts provide a method to perform a multi-image color-refinement and disparity map generation operation. The method includes obtaining first and second input images of a scene. Each input image comprising pixels, each pixel comprising a color value, each pixel in the first input image having a corresponding pixel in the second input image, and where the first and second input images were captured at substantially the same time. From the first and second input images a disparity map may be found and then used to register the two images. One or more pixels in the first input image may then be adjusted (based on the color value of the corresponding pixels in the second input image) to generate a color-refined image, where each pixel in the color-refined image has a corresponding pixel in the second input image. The combined actions of finding, registering, and adjusting may then be performed two or more additional times using the color-refined image and the second input image as the first and second input images respectively, where each of the additional times result in a new disparity map and a new color-refined image. Each new color-refined image and second image are used as the first and second input images respectively for a subsequent finding, registering, and adjusting combination. The color-refined image resulting from the last time the combined actions of finding, registering, and adjusting were performed may be stored in memory. In another embodiment, the disparity map resulting from the last time the combined actions of finding, registering, and adjusting were performed may be stored in memory. In yet another embodiment, both the last mentioned color-refined image and disparity map may be stored in memory. In one embodiment the first and second input images may be obtained from a high dynamic range image capture operation. In another embodiment, the first and second input images may be obtained from a stereoscopic (or multi-view) camera system. In still another embodiment, the first and second input images may be down-sampled (or, in general, transformed) versions of other images. Various implementations of the methods described herein may be embodied in devices (e.g., portable electronic devices incorporating a camera unit) and/or as computer executable instructions stored on a non-transitory program storage device.

DETAILED DESCRIPTION

Figure 1:
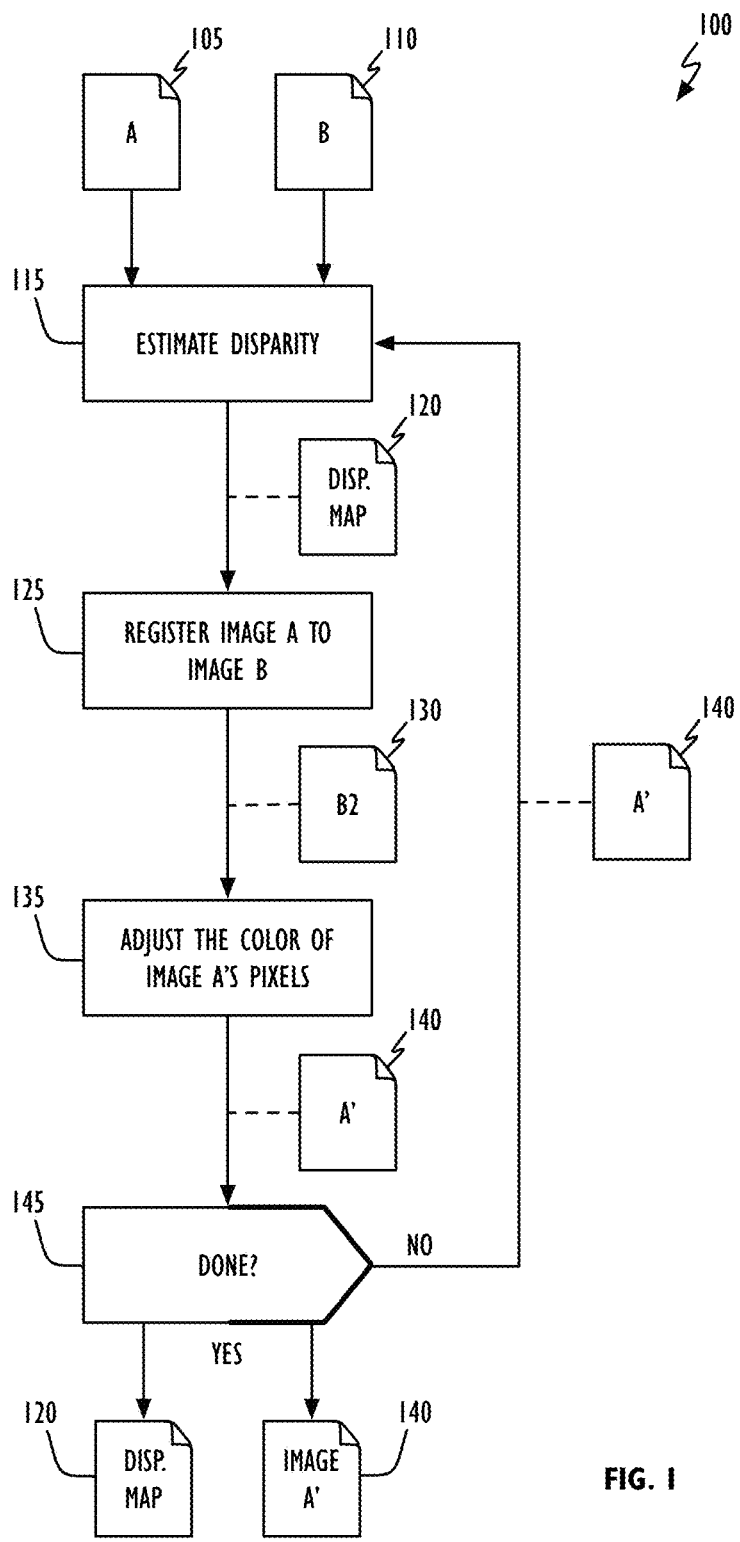
FIG. 1 shows, in flowchart form, a multi-image color-refinement operation in accordance with one embodiment.

This disclosure pertains to systems, methods, and computer readable media to improve multi-image color-refinement operations. In general, techniques are disclosed for refining color differences between images in a multi-image camera system with application to disparity estimation. As used herein, the phrase "multi-image camera system" is taken to mean a camera system that captures two or more images—each from a different physical location—at substantially the same time. While such images may be captured by widely separated image capture devices (aka cameras), large physical separation is not needed. Recognizing that corresponding pixels between two (or more) images of a scene should have not only the same spatial location, but the same color, can be used to improve the spatial alignment of two (or more) such images and the generation of improved disparity maps. After making an initial disparity estimation and using it to align the images, colors in one image may be refined toward that of another of the captured images. (The image being color corrected may be either the reference image or the image(s) being registered with the reference image.) Repeating this process in an iterative manner allows improved spatial alignment between the images and the generation of superior disparity maps between the two (or more) images.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter or resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those of ordinary skill in the design and implementation of graphics processing systems having the benefit of this disclosure.

Referring to FIG. 1, multi-image color-refinement operation 100 in accordance with one embodiment begins with input images A 105 and B 110. For the purpose of this embodiment, image A 105 is treated as the reference image and the image being color corrected. (In another embodiment, image A 105 may be treated as the reference image while image B 110 is color corrected. In still another embodiment, image B 110 may be treated as the reference image while image A 105 is color corrected. In yet another embodiment, image B 110 may be treated as the reference image and be the image that is color corrected.) If the applied color correction is global (that is, the same across the image being color corrected), color adjustment may be made to either image. If the applied color correction is local (that is, different in different regions of the image being color corrected), it has been determined that adjustment to the reference image is often the easiest because it does not change coordinates.

From input images A 105 and B 110 an initial disparity estimate may be made to generate disparity map 120 (block 115). Operations in accordance with block 115 may estimate a match at each pixel or each patch of pixels in image B 110 with a corresponding pixel or patch of pixels in reference image A 105 using a given geometric calibration between the two cameras to limit the search to epipolar lines/curves/paths in image B 110 (one camera capturing image A 105, a second camera capturing image B 110). In general, any color- or intensity-based disparity estimation algorithm operating on pixels or patches may be used. Disparity map 120 may then be used to register image B 110 to reference image A 105 to generate registered image B2 130 (block 125). During registration, pixels in image B 110 may be warped so as to spatially align with corresponding pixels in reference image A 105. In one embodiment, image B2 130 may be formed by replacing each pixel in reference image A 105 by the pixel sampled from image B 110 at the coordinates corresponding to the best match to the original pixel (in image A 105) along the epipolar line, curve, or path—guided by or based on disparity map 120. More specifically, consider a pixel at coordinate (i, j) in image B2 130: the location in image B 110 where this output pixel is sampled is determined by looking at pixel (i, j) in image A 105 and finding the best match along an epipolar path in image B 110—yielding some other coordinate (i', j'). To determine what constitutes a "best" match, any metric suitable to the target implementation may be used. Example techniques include, but are not limited to, normalized cross-correlation, sum of squared differences, and sum of absolute differences. The color of pixels in reference image A 105 may then be adjusted to better match the color of corresponding pixels in image B 110 to produce or generate color-refined image A' 140 (block 135). In one embodiment, this may be accomplished by any convenient or known image color-matching method. In another embodiment, a novel weighted non-linear color space warping approach may be used. (It will be recognized, various post-processing operations such as smoothing, filtering, or other regularization of the disparity map are also possible in addition to a matching procedure based solely on the best color/intensity match at each pixel as described here.) One illustrative implementation of such an approach is described below with respect to FIG. 2. With image A' 140, a check may be made to determine if multi-image color-refinement operation 100 has reached completion (block 145). In one embodiment, operation 100 may complete after a specified number of iterations through blocks 115-135 (e.g., 5, 15, 17, 30). In another embodiment, operation 100 may be terminated when the magnitude of updates to image A 105 at block 135 fall below a specified threshold. In still another embodiment, operation 100 may be terminated when the changes introduced during block 135 from one iteration to the next fall below a specified threshold (e.g., an absolute value or a percentage change). If the adopted termination test is not successful (the "NO" prong of block 145), blocks 115-135 may be repeated treating color-refined image A' 140 as input image A at block 115. If the adopted termination metric is successful (the "YES" prong of block 145), multi-image color-refinement operation 100 may be exited, yielding disparity map 120 and color-refined (reference) image A' 140.

Operations in accordance with FIG. 1 provide an iterative procedure that may enhance pixel-wise or patch-based matching without any transformations that attempt to normalize for color or lighting changes between the images. In accordance with operation 100, at first only strong edge features may be matched correctly. As the color of image A is progressively refined through repeated iterations however, even areas of fairly low contrast may be matched via direct intensity/color-based matching. As a consequence, pixels in smoother areas may be matched which, in the prior art, would normally not provide any reliable matching information. Operations in accordance with FIG. 1 also result in an improved/color-refined reference image (e.g., image A' 140) and a demonstrably better disparity map (e.g., map 120), both of which may be provided without the need for pre-computed calibration data such as is used in the prior art. It is noted that, while described with respect to two images, operations in accordance with FIG. 1 may be extended to any number of images. By way of example, consider a three camera/image system resulting in a third image C. From image C a resulting image C2 may be produced (corresponding to image B2 130) and aligned to image A 105. In this case, the color correction may be applied to each secondary image, i.e. image A may be left untouched and color-corrected images B2' and C2' may be produced (in lieu of image A' 140) and used as the input for each next iteration.

Figure 2:
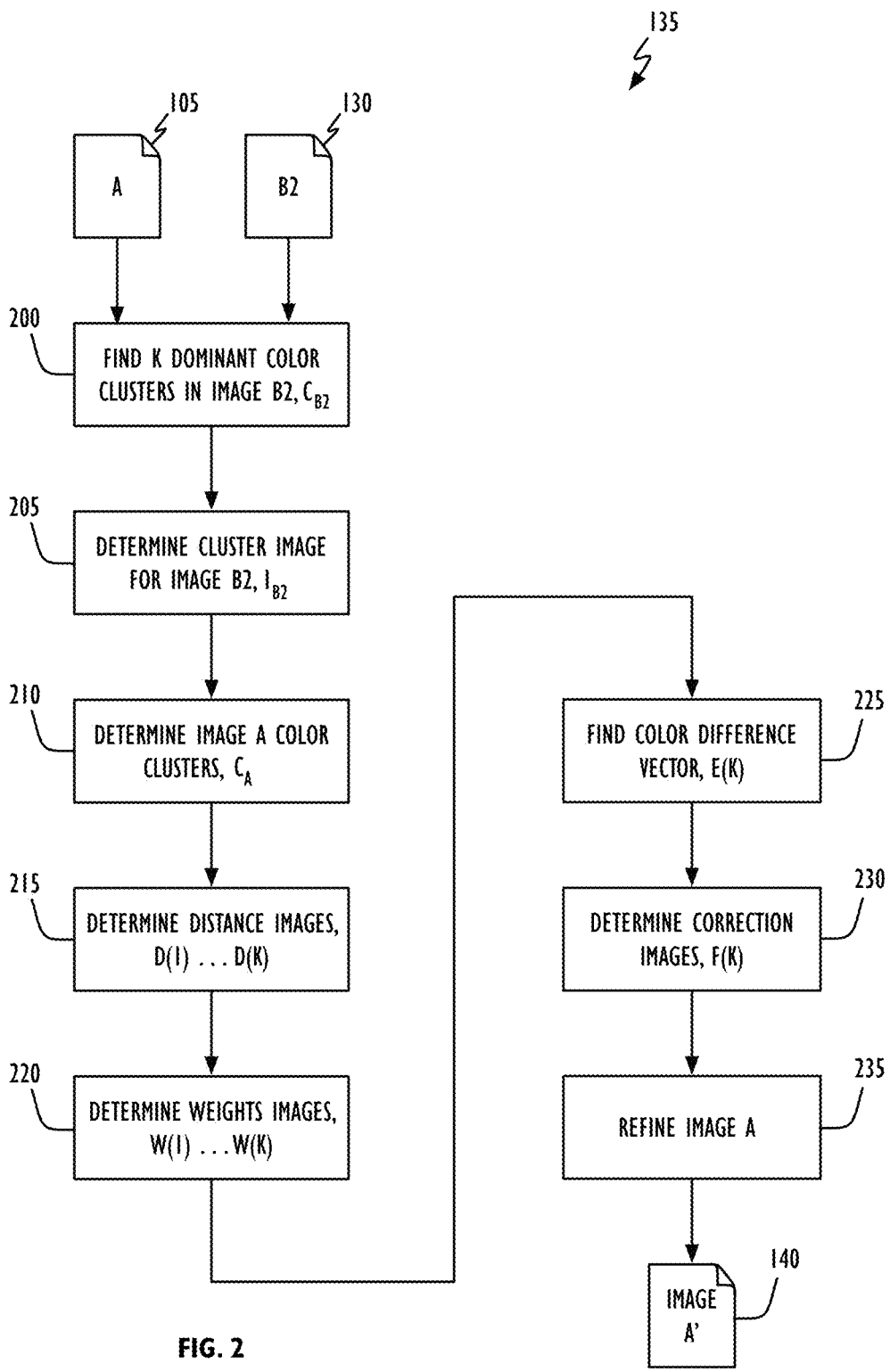
FIG. 2 shows, in flowchart form, a color-refinement operation in accordance with one embodiment.

Referring to FIG. 2, in one embodiment, color adjustment operation 135 may be implemented as an automatic non-linear weighted color-refinement process. Initially, 'k' dominant color clusters in image B2 130 may be found (block 200). In general, image B2 130 may be thought of as being represented by a multidimensional color space and dominant color clusters may be identified using, for example, the k-means algorithm with random initialization. The clusters may be represented by a k-entry vector $C_{B2}(i)$, where 'i' runs from 1 to k and where $C_{B2}(i)$ represents the mean color of the points from image B2 130 that are in the $i^{th}$ color cluster. (Note, because each entry in vector $C_{B2}$ is a color, each entry may be a multi-dimensional element having a plurality of components, e.g., R, G, and B components.) Depending on a specific implementation's goals and/or operating environment other clustering techniques that may also be used include, but are not limited to, k-medians clustering, fuzzy C-means clustering, K q-flats, and self-organizing maps. In addition, actions in accordance with block 200 may or may not utilize pre-processing activity such as the canopy clustering algorithm to speed-up the ultimate clustering operation. With clusters defined or identified in accordance with block 200, cluster index image $I_{B2}$ may be generated (block 205). As used here, cluster index image $I_{B2}$ comprises an image the same size as image B2 130 and where each element in $I_{B2}$ contains a value indicative of image B2's corresponding pixel's associated cluster. In other words, the pixel at location (i, j) in image $I_{B2}$ contains the cluster index to which the pixel at location (i, j) in image B2 130 belongs as determined during block 200.

Processing image A 105 may begin with determining its color cluster vector (block 210). Color clusters for reference image A 105 may also be represented by a k-entry vector $C_A$, where $C_A(i)$ represents the mean color value of those pixels in image A 105 corresponding to those entries in $I_{B2}$ whose value equals i. That is, for i=1 to k, $I_{B2}$ acts like a mask where only those values in image A 105 corresponding to the selected cluster (as identified in image $I_{B2}$) are selected to participate in calculating the $i^{th}$ entry in color correction vector $C_A$. A set of k distance images may then be generated (block 215):

$$D(i)=\|A-C_{B2}(i)\|, i=1 \text{ to } k \qquad \text{EQ. 1.}$$

where $\|\ \|$ represents a distance operator so that D(i) is an image whose values are equal to the distance between each pixel of image A 105 and the $i^{th}$ entry in image B2's associated color cluster image vector. In one embodiment, the distance identified in EQ. 1 may be calculated as a Euclidean distance in RGB space. Any distance metric relevant to the particular implementation may be adopted (e.g., a general Minkowski distance).

Next, a set of 'k' weight images may be found (block 220):

$$W(i)=D(i)^{-1}, i=1 \text{ to } k, \qquad \text{EQ. 2}$$

where W(i) represents the $i^{th}$ weight image and corresponds to the $i^{th}$ distance image. In one embodiment, each pixel in W(i) may be normalized by dividing its value by the sum of that pixel across all k images in W( ). As used here, the inverse is taken pixel-wise such that each element in distance image $D(i)^{-1}$ is the reciprocal of the corresponding entry in image D(i). In practice, some regularization may also be used to control the smoothness of the weights. In one embodiment, for example:

$$W(i)=(D(i)+\partial)^{-n}, i=1 \text{ to } k, \qquad \text{EQ. 2A}$$

where $\partial$ is a small constant that may be used to prevent the weights from growing too large, and 'n' could be a value greater than 1 (which will also affect the weighting function's smoothness). In another embodiment Gaussian weighting may be used:

$$W(i)=\exp^{-D(i)^2/s}, \qquad \text{EQ. 2B}$$

where 's' is a variance parameter, again controlling smoothness. In this context, smoothness may be thought of as being related to bandwidth and refers to how similar the color changes will be for different colors. For example, one smoothness function could make all colors darker, greener, etc. whereas a non-smooth function might make greens darker but cyans lighter. In general, the smoother a smoothing function is the wider its bandwidth.

It has been unexpectedly found that by varying the distance metric (e.g., EQ. 1) and weighting metric (e.g., EQS. 2-2B) used, the bandwidth of the different colors across an image that affect a single sample of the output may be controlled. As used here, the terms "bandwidth" and "single sample of output" may be taken to mean the range of colors involved and one particular color in the output image's color palette (image A's) respectively. For instance, in the embodiment described herein, a narrow bandwidth could mean that for a particular shade of red in the image to be adjusted (image A 105), only similar nearby red-colored clusters in the input image (image B2 130) would affect the color transformation to be applied to these reds in image A 105. For a wide bandwidth, say pink colored pixel clusters in image B2 130 might also have an influence on the color transformation to be applied to the red shades in image A 105. For each cluster i the color difference vector E may be found (block 225):

$$E(i)=C_{B2}(i)-C_A(i), \text{ for } i=1 \text{ to } k, \qquad \text{EQ. 3}$$

where $C_{B2}$ and $C_A$ are as described above. The color distance vectors, in turn, may be used to determine k correction images (block 230):

$$F(i)=W(i)*E(i), \qquad \text{EQ. 4}$$

where each element in image F(i) is the element-wise product of corresponding elements in images W(i) and E(i). Note, W(i) is a grayscale image while E(i) is a color value such that EQ. 4 yields a color correction image F(i). With correction images F(-) known, image A 105 may be updated (block 235). More specifically:

$$A'=A-F(i), \text{ where } i=1 \text{ to } k. \qquad \text{EQ. 5}$$

As above, A' results from an element-wise operation on corresponding elements in images A 105 and F(i)

One result of actions in accordance with block 135 is to make colors in image A 105 nearer to the colors in image B2 130 based on the correspondences of all pixels across the image that have similar colors. In a simplified implementation with only 1 cluster, the result in accordance with this disclosure would be equivalent to adjusting the mean color of image A 105 to match the mean color of image B2 130. While the precise number of color clusters may depend on the specific embodiment's goals and operating environment, it has been found that the number of color clusters depends on the input image and the smoothness of the weighting function. In practice, for global color transformations it has been found that using between 50 and 250 clusters can be sufficient to model non-linear color and intensity errors in different parts of the visible spectrum. If spatially local color corrections are to be accounted for (e.g., red gets pinker on one side of an image but browner on the other), a larger number of color clusters may be useful (e.g., 1,000). In general, it has been found that approximately 10 pixels per cluster are required to give a stable average. In the case of very small images, this may become a limiting factor. For example, in a 30×40 or 1,200 pixel image, using more than 120 clusters may start to become unstable. In addition, if too many clusters are employed (e.g., approaching the number of pixels in image A 105 and image B2 130) computational resources can become excessive. In addition, there would be no regularizing effect to mitigate image noise (a quantity in all real implementations). Part of the strength of the approached described herein is that there are typically many pixels of similar colors in the image such that the correction procedure is very stable.

Figure 3A:
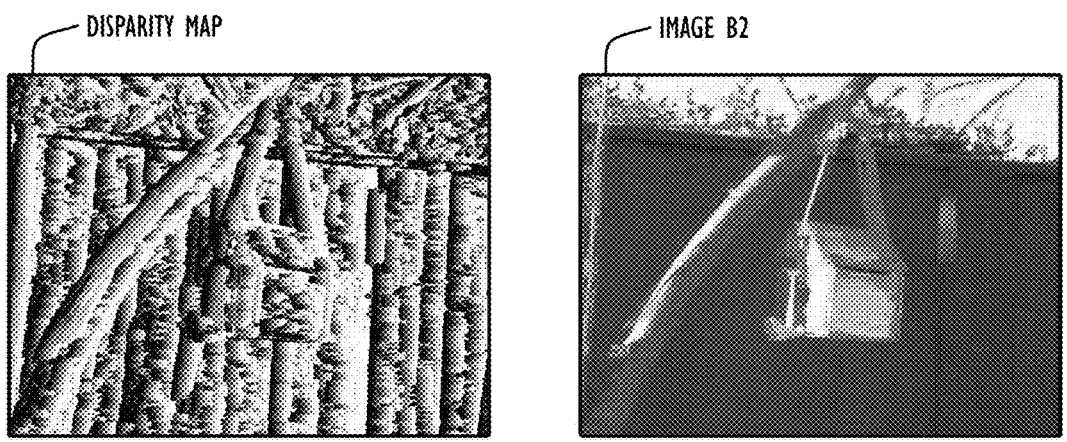
FIGS. 3A-3C illustrate the use of spatial alignment and color-refinement of an image in accordance with one embodiment.
Figure 3A:
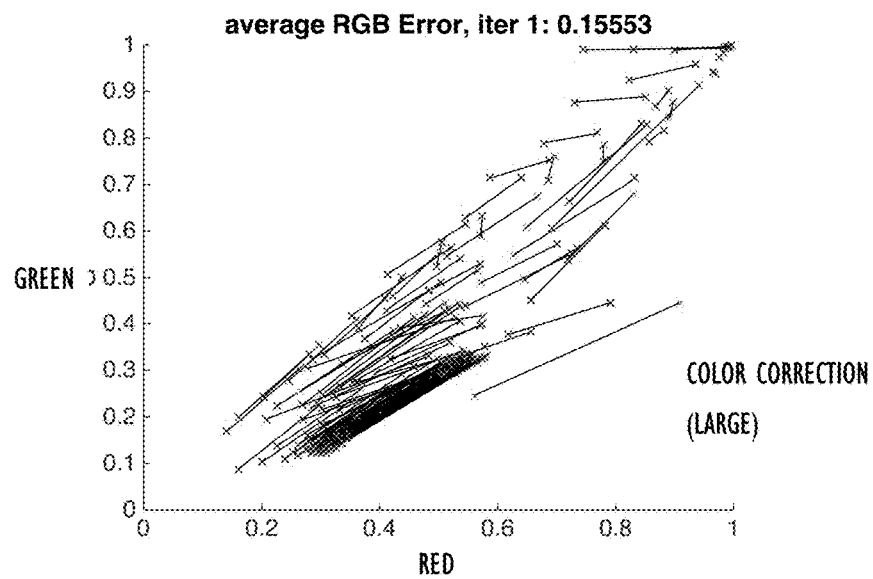
Figure 3B:
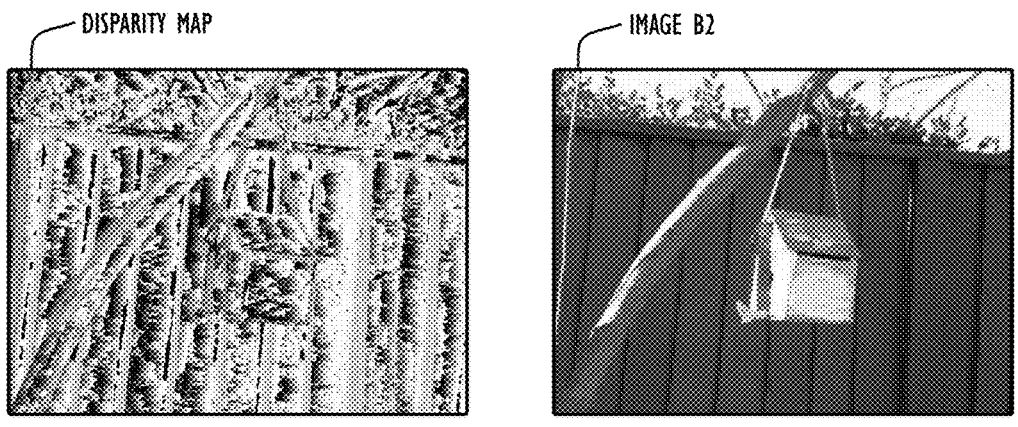
Figure 3B:
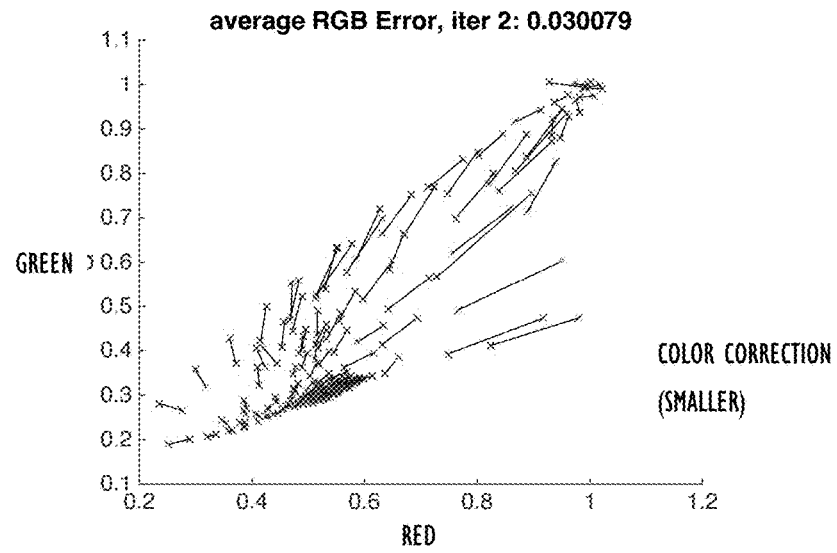
Figure 3C:
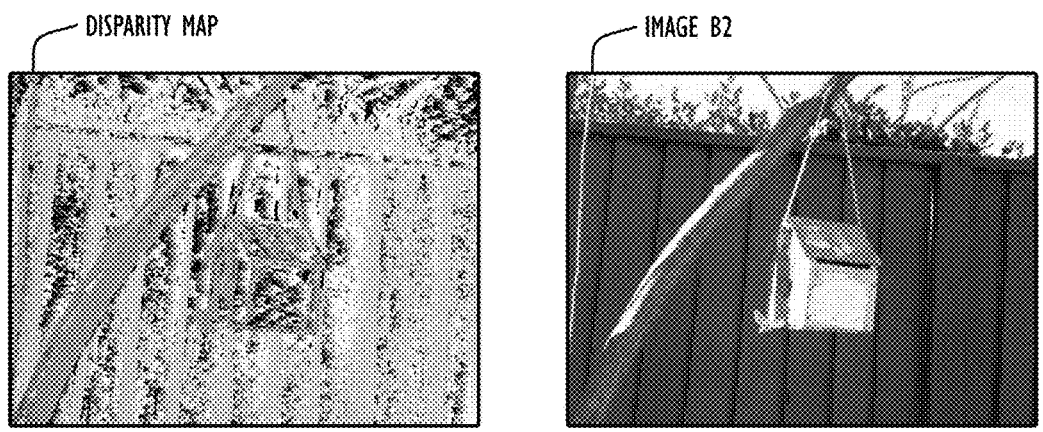
Figure 3C:
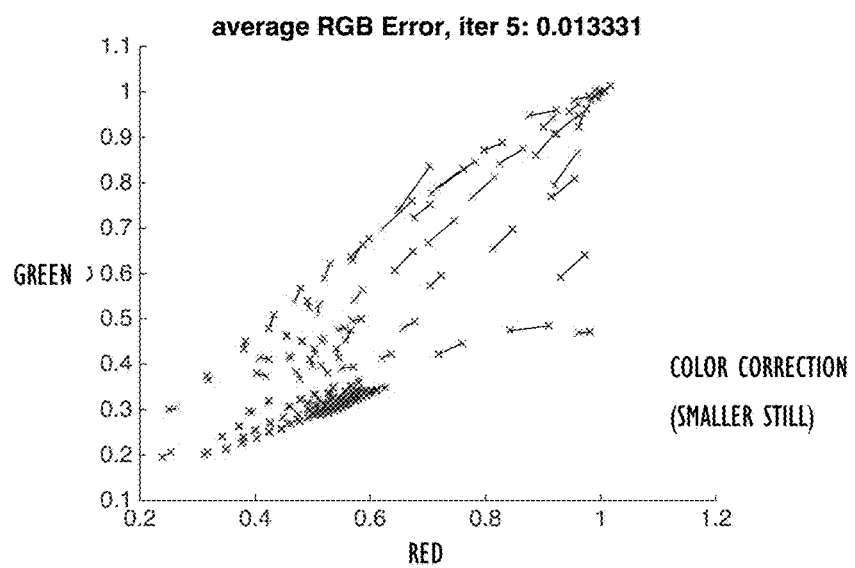

By way of example, FIGS. 3A-3C illustrate one embodiment of color-refinement operations in accordance with this disclosure. In this example, image A is adopted as the reference image and image B is the "other" input image. Image B2 represents image B after it is warped (registered) to image A using the currently estimated disparity map. In FIG. 3A ("Iteration 1"), the raw disparity is shown with no smoothing (dark regions represent "close" objects and light areas represent "distant" objects). As shown, the amount of color correction decreases from iteration 1 (FIG. 3A) to iteration 2 (FIG. 3B), to iteration 5 (FIG. 3C) where the amount of color correction is very small.

Figure 4A:
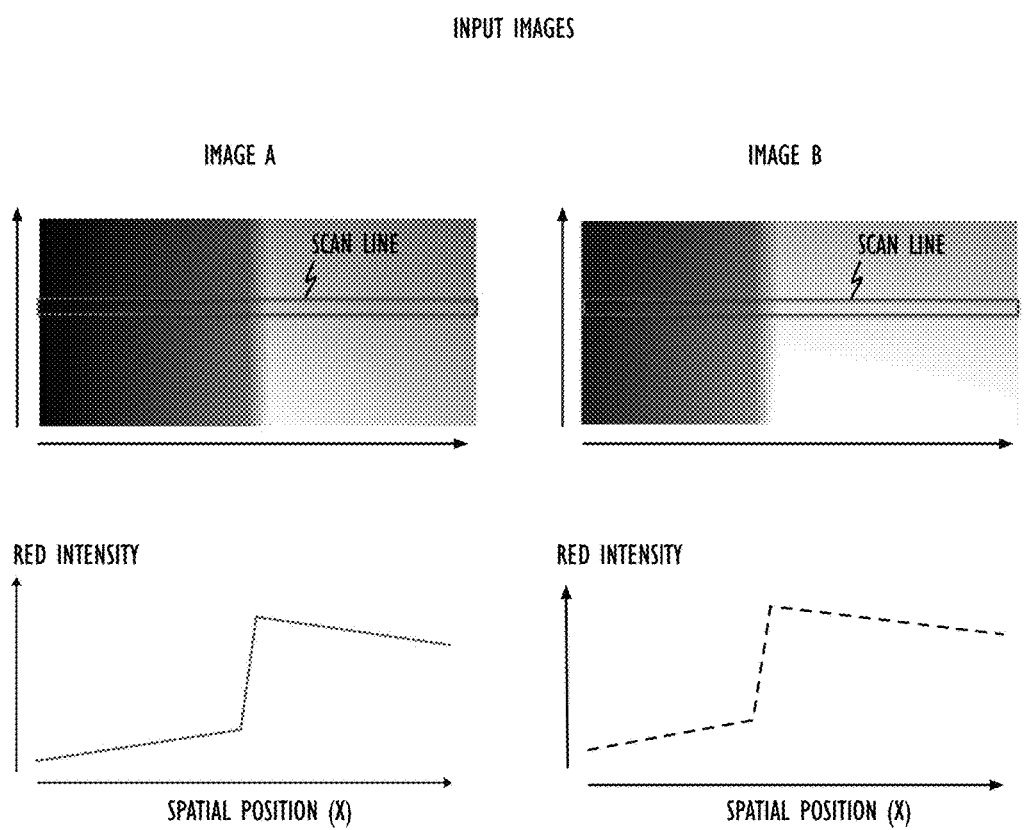
FIGS. 4A-4F illustrate the use of spatial alignment and color-refinement of scan line images in accordance with one embodiment.
Figure 4B:
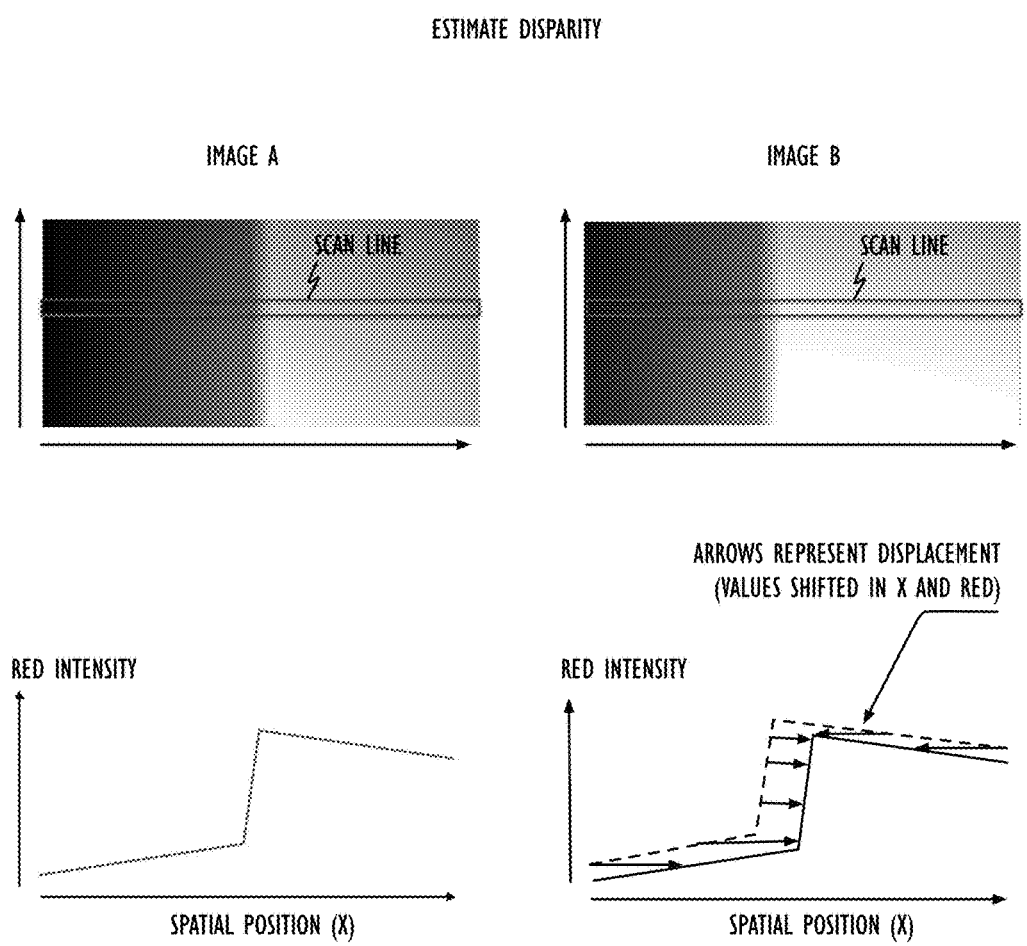
Figure 4C:
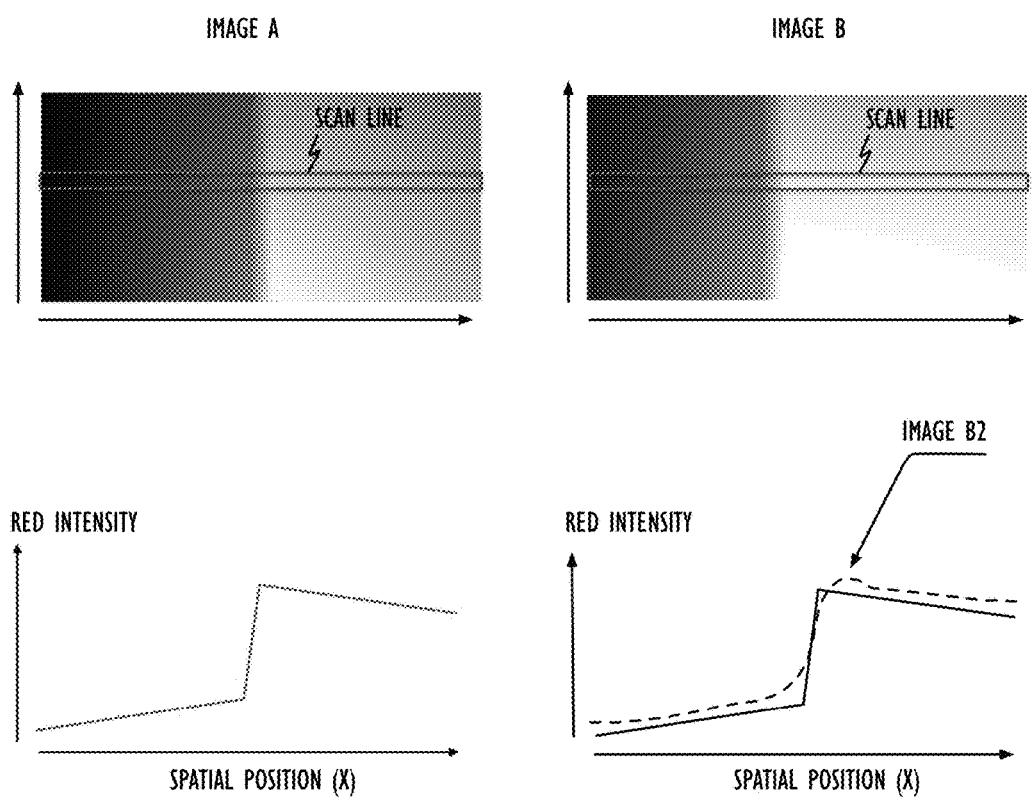
Figure 4D:
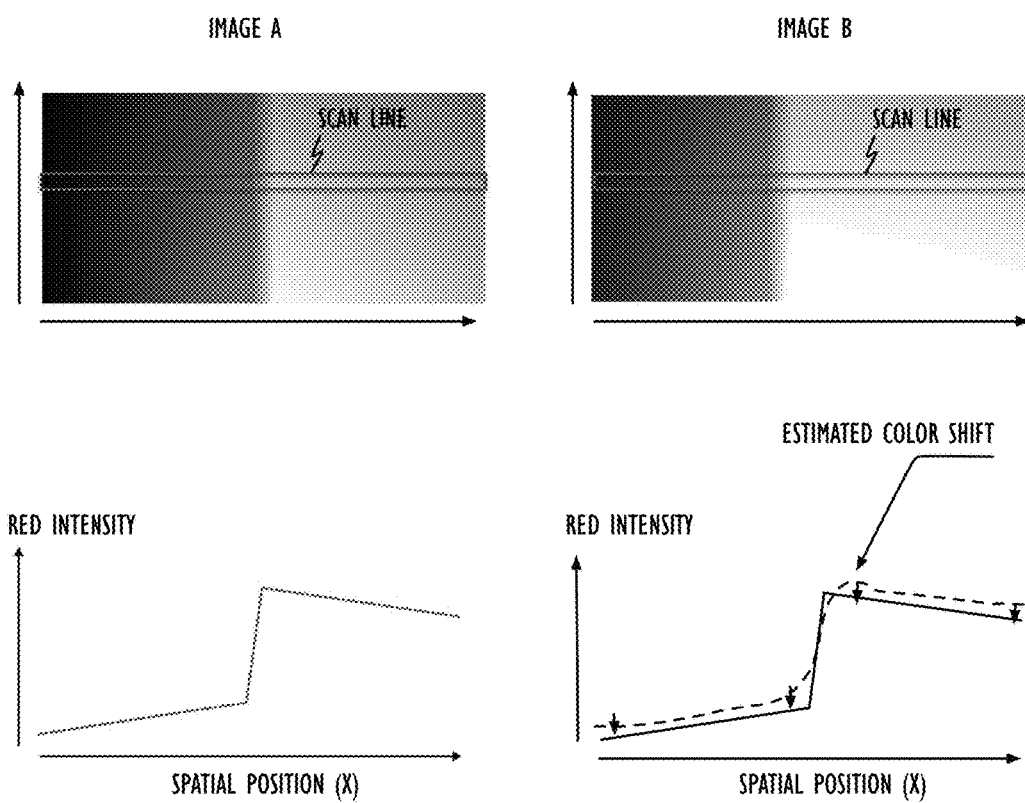
Figure 4E:
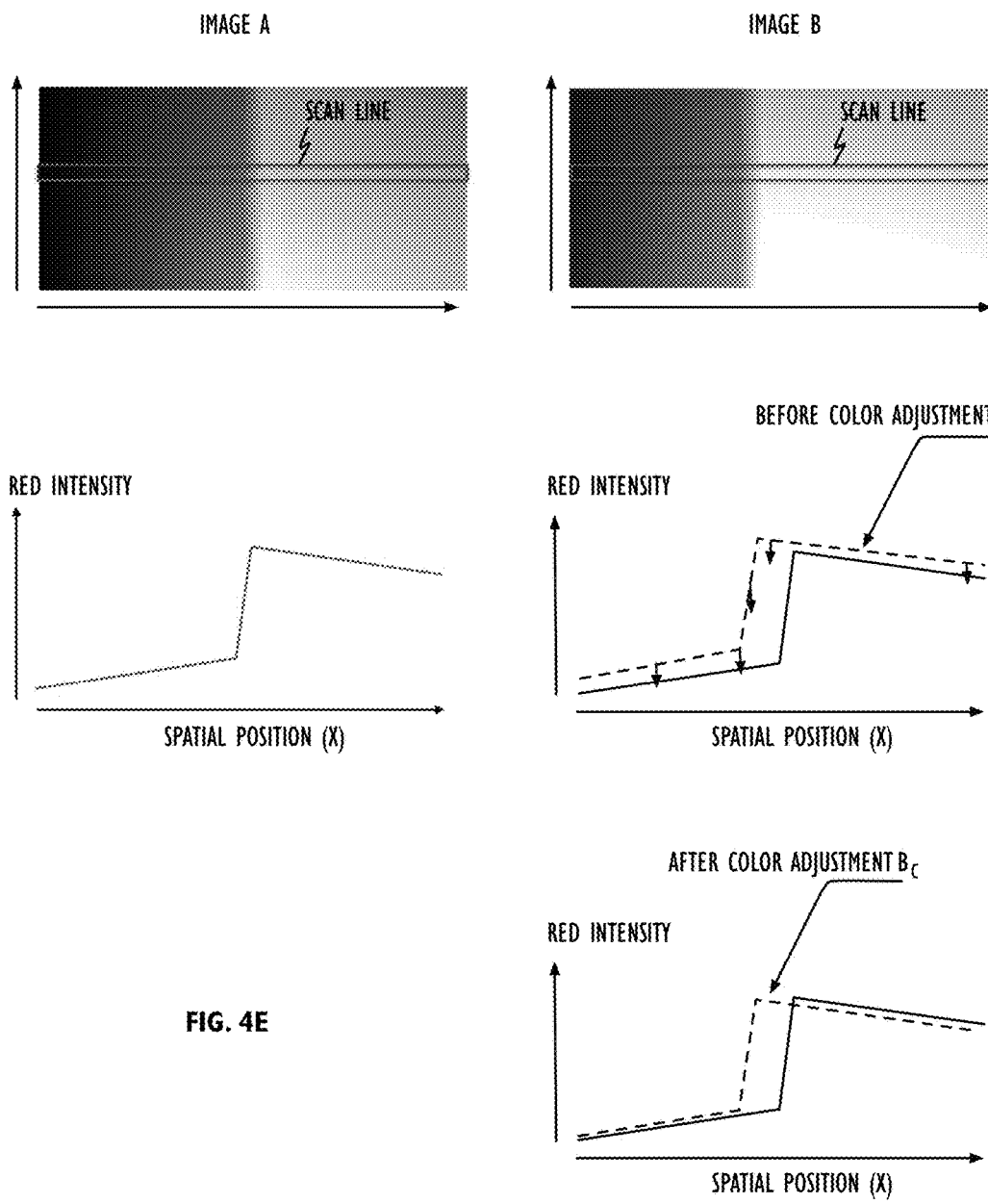
Figure 4F:
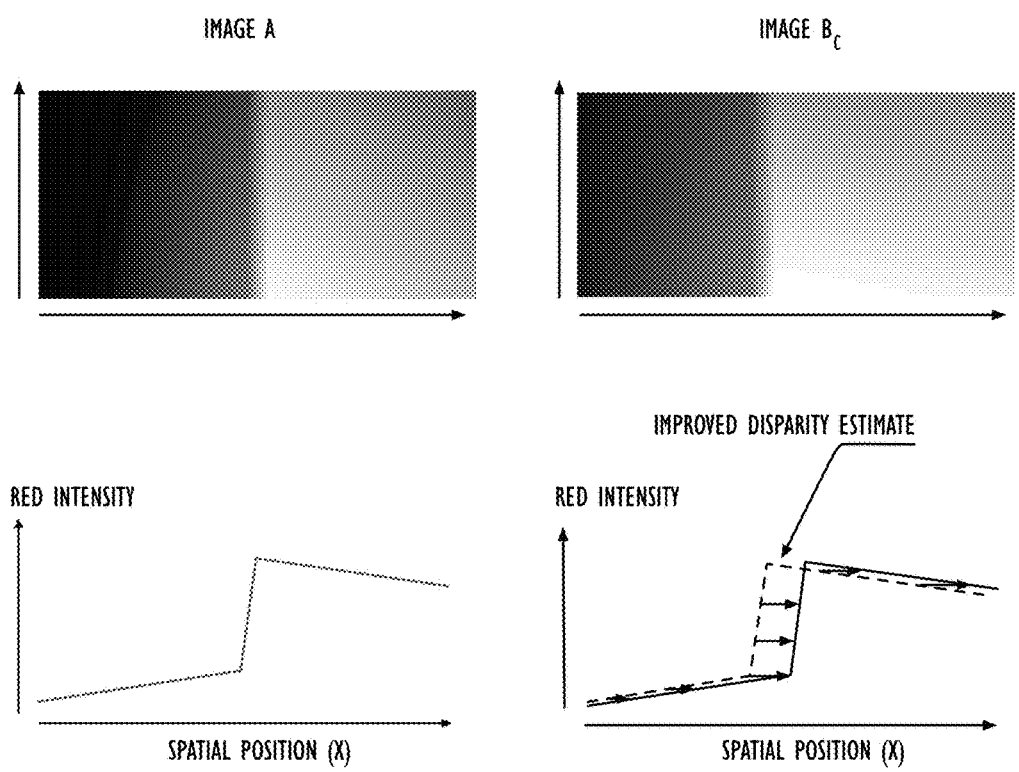

By way of another example, color correction and spatial alignment of scan line images in accordance with this disclosure is shown in FIGS. 4A-4F. To begin, input images A and B and their corresponding input scan line images may be obtained (FIG. 4A). Image A will again be taken as the reference image and color correction will again be applied to non-reference image B. Using input images A and B, an initial disparity estimate may be determined (FIG. 4B) and used to perform an initial registration of image B with image A to generate image B2 (FIG. 4C). An estimated color shift may then be determined (FIG. 4D) and applied to original image B to generate interim color-adjusted image $B_C$ (FIG. 4E). An improved disparity estimate may be made (FIG. 4F), where after the entire process may be repeated per blocks 115-135 until a suitable termination condition is met as discussed above with respect to block 145.

Figure 5:
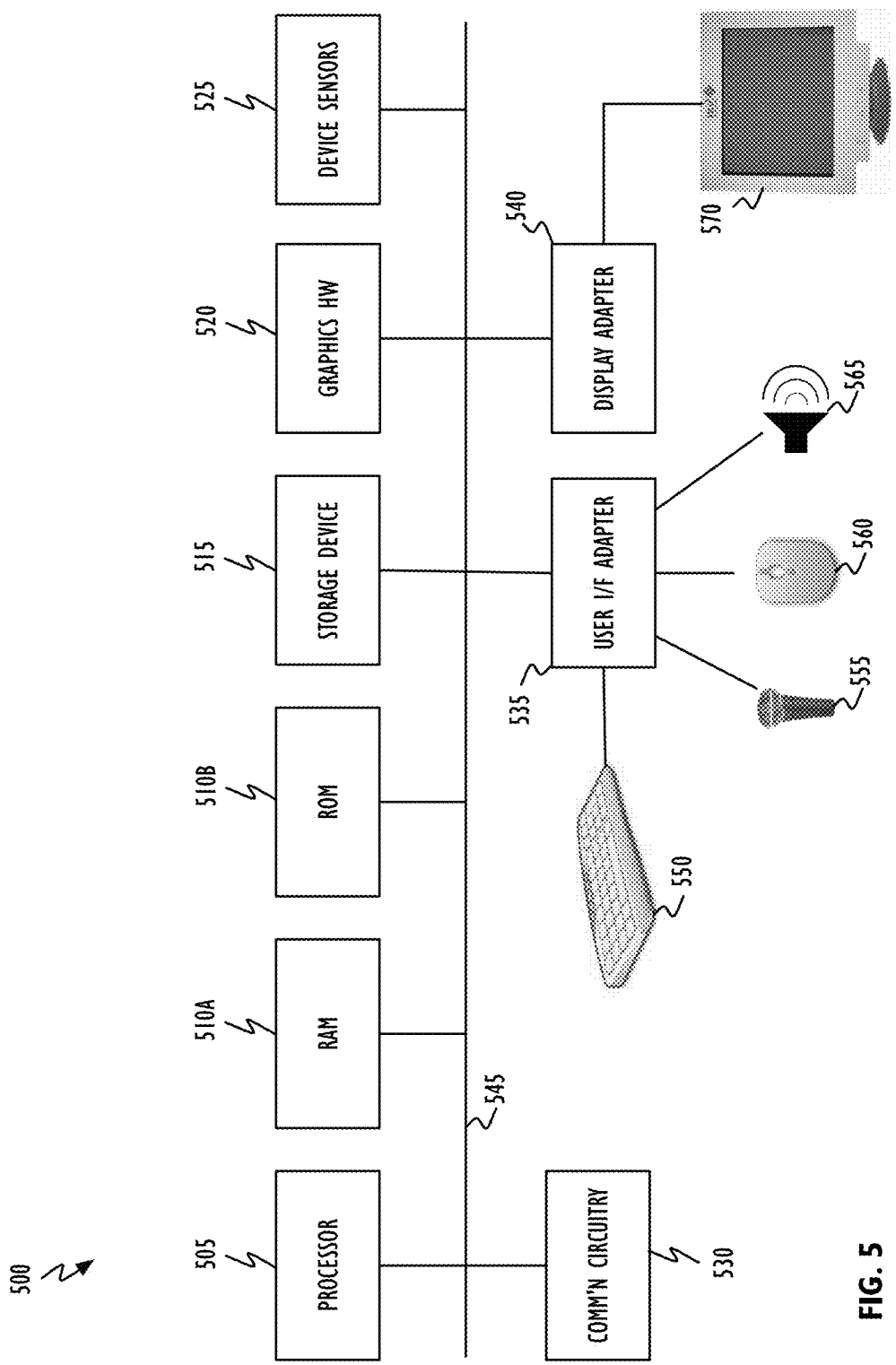
FIG. 5 shows, in block diagram form, a computer system in accordance with one embodiment.

Referring to FIG. 5, the disclosed color-refinement and disparity estimation operations may be performed by representative computer system 500 (e.g., a general purpose computer system such as a desktop, laptop, notebook or tablet computer system). Computer system 500 may include one or more processors 505, memory 510 (510A and 510B), one or more storage devices 515, graphics hardware 520, device sensors 525 (e.g., 3D depth sensor, proximity sensor, ambient light sensor, accelerometer and/or gyroscope), communication circuitry 530, user interface adapter 535 and display adapter 540—all of which may be coupled via system bus or backplane 545 which may be comprised of one or more continuous (as shown) or discontinuous communication links. Memory 510 may include one or more types of media (typically solid-state) used by processor 505 and graphics hardware 520. For example, memory 510 may include memory cache, read-only memory (ROM), and/or random access memory (RAM). Storage 515 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 510 and storage 515 may be used to retain media (e.g., audio, image, and video files), preference information, device profile information, computer program instructions or code organized into one or more modules and written in any desired computer programming language, and any other suitable data. When executed by processor(s) 505 and/or graphics hardware 520 such computer program code may implement one or more of the methods described herein. Communication circuitry 530 may be used to connect computer system 500 to one or more other networks. Illustrative networks include, but are not limited to, a local network such as a USB network, an organization's local area network, and a wide area network such as the Internet. Communication circuitry 530 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 535 may be used to connect keyboard 550, microphone 555, pointer device 560, speaker 565 and other user interface devices such as a touch-pad and/or a touch screen (not shown). Display adapter 540 may be used to connect one or more display units 570 which may provide touch input capability. Processor 505 may be a system-on-chip such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special-purpose computational hardware for processing graphics and/or assisting processor 505 with performing computational tasks. In one embodiment, graphics hardware 520 may include one or more programmable GPUs and each such unit may include one or more processing cores.

Figure 6:
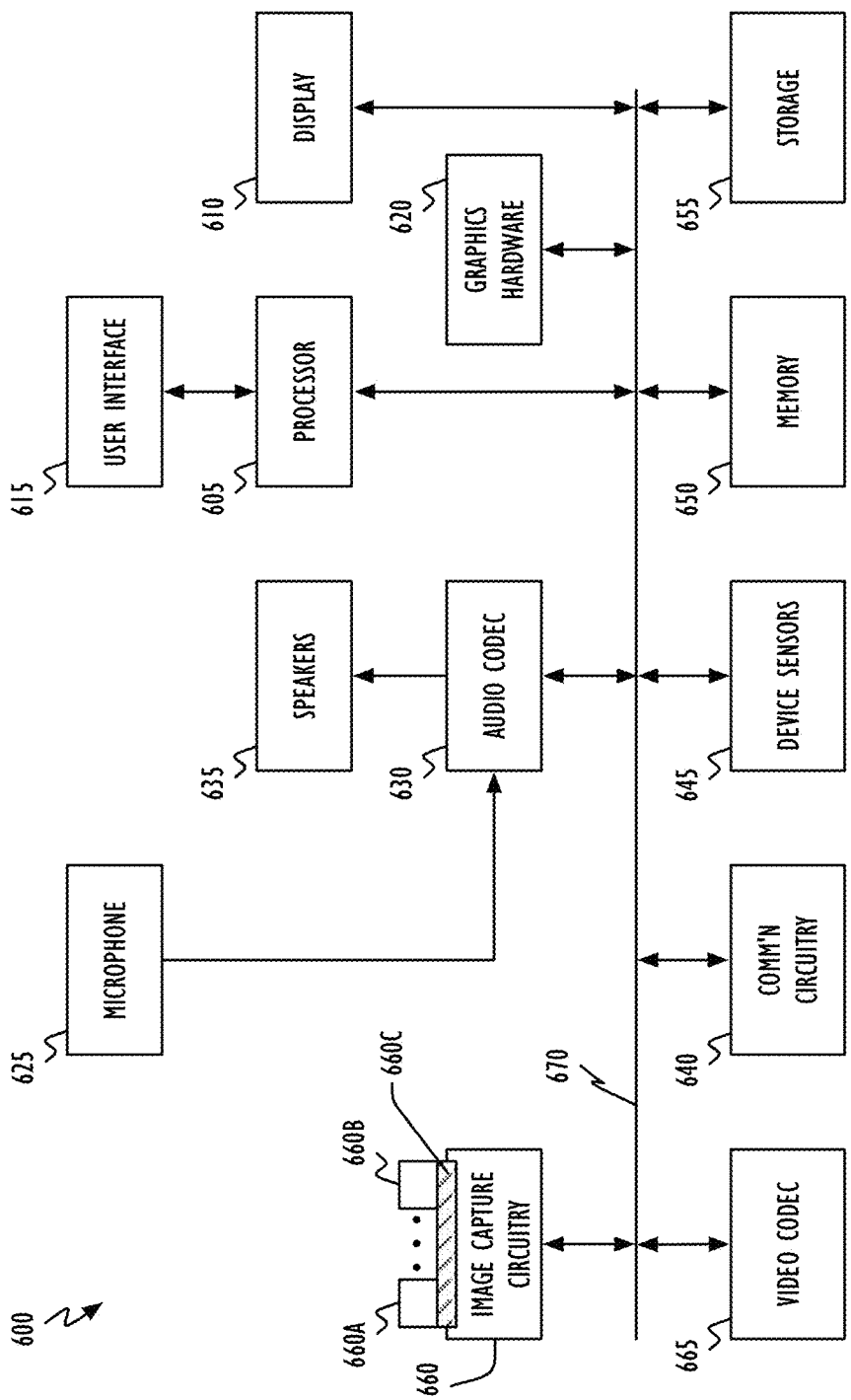
FIG. 6 shows, in block diagram form, a multi-function electronic device in accordance with one embodiment.

Referring to FIG. 6, the disclosed color-refinement and disparity estimation operations may also be performed by illustrative mobile electronic device 600 (e.g., a mobile telephone, personal media device, or a computer system in accordance with FIG. 5). As shown, electronic device 600 may include one or more processors 605, display 610, user interface 615, graphics hardware 620, microphone 625, audio codec(s) 630, speaker(s) 635, communications circuitry 640, device sensors 645, memory 650, storage 655, image capture circuitry or unit 660, video codec(s) 665, and communications bus 670. Processor 605, display 610, user interface 615, graphics hardware 620, communications circuitry 640, device sensors 645, memory 650, storage 655, and communications bus 670 may be of the same or similar type and serve the same or similar function as the similarly named component described above with respect to FIG. 5. Audio signals obtained via microphone 625 may be, at least partially, processed by audio codec(s) 630. Data so captured may be stored in memory 650 and/or storage 655 and/or output through speakers 635. Image capture circuitry 660 may include two (or more) lens assemblies 660A and 660B, where each lens assembly may have a separate focal length. For example, lens assembly 660A may have a short focal length relative to the focal length of lens assembly 660B. Each lens assembly may have a separate associated sensor element 660C. Alternatively, two or more lens assemblies may share a common sensor element. Image capture circuitry 660 may capture still and/or video images. Output from image capture circuitry 660 may be processed, at least in part, by video codec(s) 665 and/or processor 605 and/or graphics hardware 620, and/or a dedicated image processing unit or pipeline incorporated within image capture circuitry 660. Images so captured may be stored in memory 650 and/or storage 655.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, one variation in accordance with this disclosure would be to use, at the final step(s), a limited number (e.g., 'p') of the nearest color clusters for each pixel in output image A' may be used instead of all k clusters. To aid this process, some data structure (e.g., a K-d tree) may be used to preselect only nearby pixels/clusters to actually calculate the distances for each pixel, as these computations may be expensive. Another embodiment may use a color space other than RGB. For example, any representation of color and intensity may be considered (e.g., HSV, YUV, Lab, or even a mapping to a higher dimensional space). The same procedure may also be applied to monochrome images to correct exposure deviations, although it is expected to perform better in higher dimensions due to greater diversity of the samples. In yet another embodiment, the image to be corrected may be a transformed version of the input images. For example, the disparity estimation procedure may be performed at a down-sampled resolution for speed. Color correction operation 135 may use the differences between resized versions of images A and B to obtain a new color-adjusted image which may, in the end, be re-adjusted to provide a full resolution output or final image. In still another embodiment, operation 100 may be applied to any two input images of the same scene captured at approximately the same time, by the same or different cameras, where there is some exposure difference between the images (e.g., images captured during an HDR bracket operation). To increase the operational speed of operation 100 (at the cost of some approximation), once the color correction clusters have been found, rather than calculating weights, distances, and correction images for every pixel in the output image, the color transformations may be calculated using the same procedure as described, but for a representative set of color values. This representative set of transformations may be used as a look-up table for pixels in the image to be corrected.

In addition to color matching, other characteristic differences between images, such as blur, could be matched and refined in a similar way to improve disparity estimation. As described herein, color adjustment operations in accordance with block 135 were designed to deal with and correct for color distortions that are uniform (or nearly so) across the images. That is to say, color (R1, G1, B1) in image X is mapped to color (R2, G2, B2) wherever it occurs spatially. An extension that could handle some spatially local color adjustments (for example in images where tone mapping, non-uniform lens vignetting, lens flare, or other local effects had occurred) may be achieved by increasing the number of clusters used (see discussion above) and sampling them locally within the image, and modifying the weighting function used in operation 135 to take account of the spatial distance between a pixel in image X and the mean spatial location of each color cluster. One approach to achieve this would be to append the spatial coordinates as additional dimensions of the vectors $C_A$ and $C_{B2}$. In one embodiment, for example, normalized coordinates for the 'x' and 'y' positions in the image may be adopted (e.g., between 0 and 1). Then, when using the downsized A' and/or B2', a co-ordinate of (0.5, 0.5) would always correspond to the middle of an image. These normalized co-ordinates may be appended to the input images as extra "color" components/channels. For example a yellow pixel at the middle left of the image A' would have a 5 dimensional value (R, G, B, x, y)=(1.0, 1.0, 0.0, 0.0, 0.5). Because the images used to find the clusters are registered (see discussion above), the corresponding pixel in the image B2' might have different color values but will have the same spatial co-ordinates, e.g., (R, G, B, x, y)=(0.9, 0.9, 0.1, 0.0, 0.5). When clusters means $C_{A'}$(i) and $C_{B2'}$(i) are found, because the corresponding pixels in each image are used for each cluster, the mean values of the (x, y) part of each corresponding cluster will also have the same values, e.g., $C_{A'}$(1)=(0.7, 1.0, 0.0, 0.2, 0.3) and $C_{B2'}$(1)=(0.8, 1.0, 0.4, 0.2, 0.3). Once this, or a similar, approach has been implemented, the rest of operation 100 is exactly as described above except that only the (R, G, B) portion of the E( ) and F( ) vectors are meaningful (the 'x' and 'y' portions may be ignored and/or are 0). Further, silhouette processing may be applied during, or separately from, blocks 205 and 215 to determine how well each pixel belongs to its assigned cluster during generation of image $I_B$. Further, while FIGS. 1 and 2 show flowcharts illustrating various operations in accordance with the disclosed embodiments, in one or more embodiments, one or more of the disclosed steps may be omitted, repeated, and/or performed in a different order than that described herein. Accordingly, the specific arrangement of steps or actions shown in FIGS. 1 and 2 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An image processing method, comprising:
obtaining first and second input images of a scene, each input image comprising pixels, each pixel comprising a color value, each pixel in the first input image having a corresponding pixel in the second input image, wherein the first and second input images are captured at substantially the same time;
finding a disparity map between the first and second input images;
registering the first and second input images based on the disparity map;
adjusting one or more pixel color values in the first input image, based on corresponding pixel color values in the second input image, to generate a color-refined image, each pixel in the color-refined image having a corresponding pixel in the second input image;
repeating a combination of finding, registering, and adjusting a plurality of additional times using the color-refined image and the second input image as the first and second input images respectively, wherein— each of the additional times results in a new disparity map and a new color-refined image, and each successive combination of finding, registering, and adjusting uses the new color-refined image and the second input image as the first and second input images respectively; and storing in a memory at least one of the new disparity map and the new color-refined image resulting from repeating the combination of finding, registering, and adjusting the plurality of additional times, wherein repeating the combination of finding, registering, and adjusting is terminated when a specified threshold value has been met.

2. The method of claim 1, wherein obtaining first and second input images comprises:

obtaining first and second images, wherein each of the first and second images has an initial resolution; and transforming the first image to the first input image and the second image to the second input image.

3. The method of claim 2, wherein transforming comprises down-sampling.

4. The method of claim 3, wherein storing further comprises up-sampling each of the at least one new disparity map and the new color-refined image before storing.

5. The method of claim 1, wherein each new disparity map comprises a spatially-aligned disparity map.

6. The method of claim 1, wherein adjusting comprises adjusting one or more pixel color values in the first input image, based on corresponding pixel color values along an epipolar curve in the second input image.

7. The method of claim 1, wherein repeating further comprises determining a value based on the new color-refined image.

8. The method of claim 1, wherein adjusting comprises:

determining a first plurality of color clusters of the second input image; and determining a color cluster value for each of the first plurality of color clusters of the second input image, resulting in a first plurality of color cluster values.

9. The method of claim 8, further comprising determining a first plurality of distance images based on the first input image and the first plurality of color cluster values.

10. The method of claim 9, further comprising determining a second plurality of color cluster values based on a second plurality of color clusters of the first input image.

11. The method of claim 10, further comprising determining a first plurality of color difference values based on the first plurality of color cluster values of the second input image and the second plurality of color cluster values of the first input image.

12. The method of claim 11, further comprising determining a first plurality of correction images based on the first plurality of distance images and the first plurality of color difference values.

13. The method of claim 12, further comprising adjusting one or more pixel color values in the first input image based on the first plurality of correction images.

14. An electronic device, comprising:

a first lens assembly;

a second lens assembly;

a memory operatively coupled to the first and second lens assemblies;

one or more processors operatively coupled to the first and second lens assemblies and the memory, the one or more processors configured to execute instructions stored in the memory to cause the one or more processors to:

obtain first and second input images of a scene, each input image comprising pixels, each pixel comprising a color value, each pixel in the first input image having a corresponding pixel in the second input image, wherein the first and second input images are captured at substantially the same time;

find a disparity map between the first and second input images;

register the first and second input images based on the disparity map;

adjust one or more pixel color values in the first input image, based on corresponding pixel color values in the second input image, to generate a color-refined image, each pixel in the color-refined image having a corresponding pixel in the second input image;

repeat a combination of finding, registering, and adjusting a plurality of additional times using the color-refined image and the second input image as the first and second input images respectively, wherein— each of the additional times results in a new disparity map and a new color-refined image, and each successive repetition of the combination of finding, registering, and adjusting uses the new color-refined image and the second input image as the first and second input images respectively; and store, in the memory, at least one of the new disparity map and the new color-refined image resulting from the repetition of the combination of finding, registering, and adjusting the plurality of additional times, wherein the repetition of the combination of finding, registering, and adjusting is terminated when a specified threshold value has been met.

15. The electronic device of claim 14, wherein the instructions to cause the one or more processors to obtain first and second input images comprise instructions to cause the one or more processors to:

obtain first and second images, wherein each of the first and second images has an initial resolution;

down-sample the first image to generate the first input image; and down-sample the second image to generate the second input image.

16. The electronic device of claim 14, wherein the instructions to cause the one or more processors to repeat further comprise instructions to cause the one or more processors to determine a value based on the new color-refined image.

17. A non-transitory program storage device comprising instructions stored thereon to cause one or more processors to:

obtain first and second input images of a scene, each input image comprising pixels, each pixel comprising a color value, each pixel in the first input image having a corresponding pixel in the second input image, wherein the first and second input images are captured at substantially the same time;

find a disparity map between the first and second input images;

register the first and second input images based on the disparity map;

adjust one or more pixel color values in the first input image, based on corresponding pixel color values in the second input image, to generate a color-refined image, each pixel in the color-refined image having a corresponding pixel in the second input image;

repeat a combination of finding, registering, and adjusting a plurality of additional times using the color-refined image and the second input image as the first and second input images respectively, wherein—
  each of the additional times result in a new disparity map and a new color-refined image, and
  each successive repetition of the combination of finding, registering, and adjusting uses the new color-refined image and the second input image as the first and second input images respectively; and
store, in a memory, at least one of the new disparity map and the new color-refined image resulting from the repetition of the combination of finding, registering, and adjusting the plurality of additional times,
wherein the repetition of the combination of finding, registering, and adjusting is terminated when a specified threshold value has been met.

18. The non-transitory program storage device of claim 17, wherein the instructions to cause one or more processors to obtain first and second input images comprise instructions to cause the one or more processors to:
  obtain first and second images, wherein each of the first and second images has an initial resolution;
  down-sample the first image to generate the first input image; and
  down-sample the second image to generate the second input image.

19. The non-transitory program storage device of claim 17, wherein the instructions to cause the one or more processors to repeat further comprise instructions to cause the one or more processors to determine a value based on the new color-refined image.

* * * * *